United States Patent
Tadayon et al.

(10) Patent No.: US 11,906,368 B2
(45) Date of Patent: Feb. 20, 2024

(54) TEMPERATURE MEASUREMENT SYSTEM AND METHOD USING OPTICAL SIGNAL TRANSMISSION THROUGH AN OPTICAL INTERFEROMETER

(71) Applicant: Fluke Corporation, Everett, WA (US)

(72) Inventors: Mohammad Amin Tadayon, Gaithersburg, MD (US); Kevin R. Williamson, Belgrade, MT (US)

(73) Assignee: Fluke Corporation, Everett, WA (US)

( * ) Notice: Subject to any disclaimer, the term of this patent is extended or adjusted under 35 U.S.C. 154(b) by 208 days.

(21) Appl. No.: 17/338,454

(22) Filed: Jun. 3, 2021

(65) Prior Publication Data
US 2021/0381908 A1 Dec. 9, 2021

Related U.S. Application Data

(60) Provisional application No. 63/034,063, filed on Jun. 3, 2020.

(51) Int. Cl.
*G01K 11/3206* (2021.01)
*G01B 9/02015* (2022.01)
(Continued)

(52) U.S. Cl.
CPC ...... *G01K 11/3206* (2013.01); *G01B 9/02015* (2013.01); *G01K 15/005* (2013.01); *G01K 11/32* (2013.01)

(58) Field of Classification Search
CPC .. G01K 11/3206; G01K 15/005; G01K 11/32; G01B 9/02015
See application file for complete search history.

(56) References Cited

U.S. PATENT DOCUMENTS 4,515,430 A * 5/1985 Johnson ............... G02B 6/30
356/477
4,714,342 A * 12/1987 Jackson ............... G01K 11/32
374/161

(Continued)

FOREIGN PATENT DOCUMENTS

| CN | 101825480 A | 9/2010 |
| WO | 84/04385 A1 | 11/1984 |
| WO | 2021/156731 A1 | 8/2021 |

OTHER PUBLICATIONS

Xu, H. et al., "Ultra-sensitive chip-based photonic temperature sensor using ring resonator structures", Optics Express, 22(3), 3098-3104, 2014, 7 pages.
(Continued)

*Primary Examiner* — Nathaniel T Woodward
*Assistant Examiner* — Philip L Cotey
(74) *Attorney, Agent, or Firm* — Seed IP Law Group LLP

(57) ABSTRACT

A temperature measurement technology includes generating an input optical signal at a wavelength using an optical signal generator, splitting the input optical signal into a first beam and a second beam, optically transmitting the first beam through the first arm of an interferometer, transmitting the second beam through a second arm of the interferometer that introduces a phase shift in the second beam relative to the first beam, combining at least a portion of the transmitted first beam and the transmitted phase-shifted second beam to produce an output optical signal, measuring an optical signal intensity of the output optical signal, and correlating the measured optical signal intensity with a temperature to produce a measured temperature. Alternatively, the input optical signal may be transmitted through two or more interferometers.

20 Claims, 4 Drawing Sheets

(51) Int. Cl.
*G01K 15/00* (2006.01)
*G01K 11/32* (2021.01)

(56) References Cited

U.S. PATENT DOCUMENTS

| | | | | |
|---|---|---|---|---|
| 4,974,961 | A * | 12/1990 | Jackson | G01D 5/35303 |
| | | | | 356/477 |
| 5,317,524 | A * | 5/1994 | Das | G01D 5/268 |
| | | | | 250/227.21 |
| 6,243,506 | B1 * | 6/2001 | Wu | G01K 11/00 |
| | | | | 385/12 |
| 7,327,472 | B2 * | 2/2008 | Riza | G01K 5/52 |
| | | | | 356/519 |
| 7,796,262 | B1 * | 9/2010 | Wang | G01N 33/54393 |
| | | | | 356/441 |
| 8,096,704 | B2 * | 1/2012 | Riza | G01J 5/0018 |
| | | | | 374/161 |
| 9,726,553 | B2 * | 8/2017 | Ahmed | G01K 11/00 |
| 10,056,733 | B1 * | 8/2018 | Taylor | G02B 6/2813 |
| 10,900,838 | B1 * | 1/2021 | Podmore | G01J 3/1895 |
| 10,955,617 | B2 * | 3/2021 | Klimov | G02B 6/12 |
| 2003/0118075 | A1 * | 6/2003 | Schweiger | G01K 11/3206 |
| | | | | 374/161 |
| 2005/0213869 | A1 * | 9/2005 | Brown | G01D 5/35364 |
| | | | | 374/E11.015 |
| 2006/0017932 | A1 * | 1/2006 | Riza | G01K 5/52 |
| | | | | 374/E5.034 |
| 2010/0290055 | A1 * | 11/2010 | Kim | G01N 21/23 |
| | | | | 356/453 |
| 2013/0194578 | A1 * | 8/2013 | Niskanen | G01K 11/32 |
| | | | | 356/450 |
| 2016/0047677 | A1 * | 2/2016 | Heidrich | G01N 21/7746 |
| | | | | 356/480 |
| 2016/0305984 | A1 * | 10/2016 | Bohnert | G01R 15/247 |
| 2017/0153387 | A1 * | 6/2017 | Wei | G01B 11/2441 |
| 2017/0276870 | A1 * | 9/2017 | Snyman | G01P 5/20 |
| 2019/0011253 | A1 * | 1/2019 | Ding | G02B 6/2935 |
| 2021/0018431 | A1 * | 1/2021 | Viegas | G01K 11/32 |
| 2021/0164853 | A1 * | 6/2021 | Vez | G01D 3/0365 |
| 2021/0172833 | A1 * | 6/2021 | Ahmed | G02B 1/005 |
| 2021/0231526 | A1 * | 7/2021 | Seeley | G01B 11/18 |
| 2021/0278289 | A1 * | 9/2021 | Nasilowski | G01K 3/005 |
| 2021/0333089 | A1 * | 10/2021 | Han | G01B 9/02003 |
| 2021/0381906 | A1 | 12/2021 | Tadayon et al. | |

OTHER PUBLICATIONS

Klimov, N. N. et al., "On-Chip Silicon Waveguide Bragg Grating Photonic Temperature Sensor", Optics Letters, 40(17), 3934-3936, 2015, 4 pages.

Klimov, N. et al., "Towards Replacing Resistance Thermometry with Photonic Thermometry", Sensors and Actuators A: Physical, 269, 308-312, 2018, 7 pages.

Paschotta, R., "Free Spectral Range", RP Photonics Encyclopedia, https://www.rp-photonics.com/free_spectral_range.html, downloaded Mar. 20, 2023, 4 pages.

Paschotta, R., "Resonator Modes", RP Photonics Encyclopedia, https://www.rp-photonics.com/resonator_modes.html, downloaded Mar. 20, 2023, 8 pages.

International Search Report and Written Opinion for Application No. PCT/US2021/035767, dated Sep. 28, 2021, 14 pgs.

U.S. Appl. No. 18/186,801, filed Mar. 20, 2023.

International Search Report and Written Opinion for Application No. PCT/US2021/035757, dated Sep. 30, 2021, 16 pgs.

International Search Report and Written Opinion for Application No. PCT/US2022/082640, dated Apr. 11, 2023, 12 pages.

U.S. Appl. No. 17/338,313, filed Jun. 3, 2021.

* cited by examiner

TEMPERATURE MEASUREMENT SYSTEM AND METHOD USING OPTICAL SIGNAL TRANSMISSION THROUGH AN OPTICAL INTERFEROMETER

BACKGROUND

Technical Field

This disclosure pertains to temperature measurement, and more particularly to temperature measurement using transmission of optical signals through an interferometer.

Description of the Related Art

Optical systems for temperature measurement are known in the art. Such systems require an expensive input laser having a large, tunable range (e.g., 70 nanometer (nm)) of output signal wavelengths. Such systems detect the temperature by varying the wavelength of an input optical signal over a wide wavelength range and identifying the input signal wavelength having greater resonance in the system. The identified input signal wavelength is correlated with temperature. What is needed are methods and systems that are more practical and less expensive to manufacture, more compact to implement, and more robust to operate than the presently-known optical thermometers.

BRIEF SUMMARY

Disclosed herein are a temperature measurement system on a chip and related methods for measuring temperatures based on one or more interferometers. The disclosed system transmits an optical signal through an optical interferometer, such as a Mach-Zehnder interferometer (MZI) or Michelson interferometer (MI), to detect, measure, or report temperature. As the temperature of the interferometer changes, a corresponding change occurs in the intensity of the optical signal that is transmitted through the interferometer. Measured changes in the optical signal intensity are used to determine the temperature.

The disclosed method for measurement of temperature includes providing an input optical signal at a single wavelength to an interferometer, measuring an optical signal intensity of an output optical signal of the interferometer, and determining a temperature based on a characteristic curve that relates a range of output optical signal intensities to a range of temperatures. The method may also include splitting the input optical signal into a first beam and a second beam, causing a temperature-dependent phase shift in the second beam relative to the first beam to produce a phase-shifted second beam, and combining at least a portion of the first beam and the phase-shifted second beam to produce the output optical signal. The characteristic curve may be represented by a look-up table or a mathematical function. Accordingly, the temperature can be determined using the optical signal intensity as an index to a look-up table or as a parameter to a mathematical function.

DETAILED DESCRIPTION

Disclosed herein are methods and systems that use transmission of an optical signal through an optical interferometer, such as a Mach-Zehnder interferometer (MZI) or Michelson interferometer (MI), to detect, measure, or report temperature. As the temperature of the interferometer changes, a corresponding change occurs in the intensity of the optical signal that is transmitted through the interferometer. Measured changes in the optical signal intensity are used to determine the temperature.

Figure 1A:
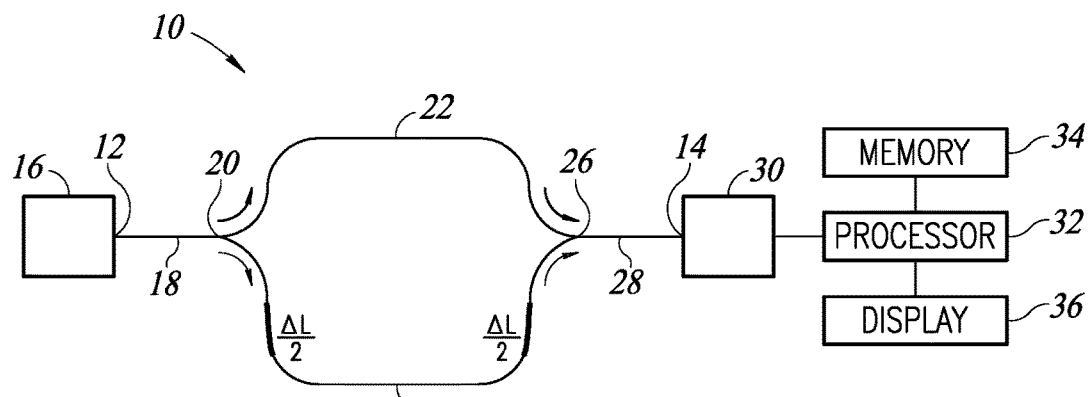
FIG. 1A is a schematic diagram of a temperature measurement system using a Mach-Zehnder interferometer (MZI) to determine temperature according to the principles of the present disclosure.

FIG. 1A is a schematic diagram illustrating one example of a system that includes a Mach-Zehnder interferometer (MZI) 10 that can be used to detect temperature. The MZI 10 has an optical signal input 12 and an optical signal output 14. The optical signal input 12 is coupled to an optical signal generator 16 that generates an optical signal at a predetermined wavelength. The generated optical signal is input to the MZI 10. In various embodiments, the optical signal generator 16 may be, for example, a narrowband laser that produces a laser beam in a narrow wavelength range. In many cases, the narrowband laser may be referred to as a single wavelength laser.

The optical signal generator 16 may have low tunability around the wavelength of its optical signal output. In various embodiments where a narrowband laser is used, the laser may have a tunability range of, for example, 0.001-4 nm or 1-4 nm centered around an output wavelength. As will be understood from the description herein, at least one advantage of a system that implements the present invention is that the system requires little to no wavelength tuning of the optical signal that is generated by the optical signal generator 16 and input to the MZI 10.

In FIG. 1A, the optical signal generated by the optical signal generator 16 is received by the MZI 10 at the optical signal input 12. Thereafter, the input optical signal propagates along a waveguide 18 that provides an optical transmission path from the optical signal input 12 to a beam splitter 20. The beam splitter 20 depicted in FIG. 1A is a Y-junction splitter that splits the input optical signal into two beams. A first beam of the two beams is propagated along a waveguide that constitutes a first arm 22 of the MZI 10, and a second beam of the two beams is transmitted along a waveguide that constitutes a second arm 24 of the MZI 10.

The first arm 22 provides an optical transmission path that has a length of length L, while the second arm 24 provides an optical transmission path that is longer and has a length of length L+ΔL.

Figure 5:
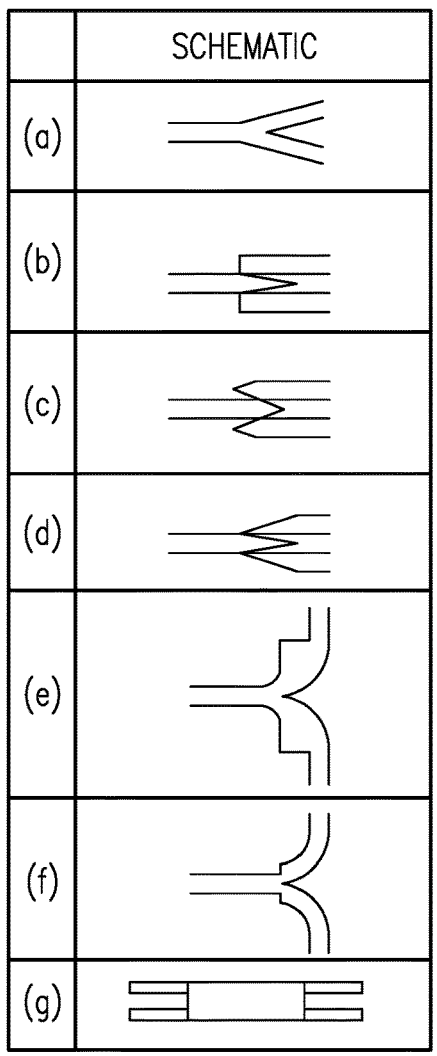
FIG. 5 is a chart showing various optical junctions or directional couplers that may be used to split or combine optical signals in embodiments of the present disclosure.

The first arm 22 and the second arm 24 of the MZI 10 provide separate optical transmission paths from the beam splitter 20 to a beam combiner 26. The beam combiner 26 in FIG. 1A is depicted as a Y-junction combiner that receives the first and second optical beams transmitted along the first and second arms 22, 24 and combines the beams into a combined optical signal. The beam combiner 26 outputs the combined optical signal, which propagates along a waveguide 28 to the optical signal output 14. The waveguides 18, 28 may be any length as needed for particular implementations, or even omitted (where the optical signal generator 16 directly inputs the optical signal into the beam splitter 20, and the beam combiner 26 directly outputs the combined output optical signal to an optical signal detector 30). While the beam splitter 20 and beam combiner 26 are depicted as Y-junction couplers in the example shown in FIG. 1A, other types of couplers may be used, including, without limitation, directional couplers and multimode interference couplers, e.g., as shown in FIG. 5.

Coupled to the optical signal output 14 is an optical signal detector 30 that receives and detects the intensity of the output optical signal. In various embodiments, the optical signal detector 30 may be a photodetector configured to detect the intensity of the output optical signal. The optical signal detector 30 may detect the intensity of the output optical signal by measuring, for example, the optical power of the output optical signal (e.g., power per unit area of the photodetector (W/cm$^2$)).

As shown in FIG. 1A, the transmission path of the second arm 24 is longer than the transmission path of the first arm 22 by the length ΔL. This difference in length of the transmission paths of the first and second arms 22, 24 introduces a relative phase difference in the optical beams that are received by the beam combiner 26. Depending on the phase difference of the two optical beams transmitted through the first and second arms 22, 24, the optical beams may combine with constructive interference (where the optical intensity of the combined beams is additive), or the optical beams may combine with destructive interference (where, in the combined optical signal, the optical intensity of one beam subtracts from or diminishes the optical intensity of the other beam).

The phase difference between the optical beams transmitted through the first and second arms 22, 24 of the MZI 10 varies according to the temperature of the MZI 10. This temperature-dependent phase difference is mostly due to temperature-dependent changes in the refractive index of the materials that comprise the waveguides of the first and second arms 22, 24. The refractive index of a material is a dimensionless value that describes how fast light travels through the material. As the temperature of the MZI 10 increases or decreases, the optical path in the material changes, resulting in a variable relative phase difference of the optical beams traversing the first and second arms 22, 24. To a much lesser degree, the phase difference between the optical beams varies according to the temperature of the MZI 10 due to the thermal expansion index of the materials that make the waveguides of the first and second arms 22, 24. Changes in the temperature of the MZI 10 may result in slight variations in the length of the transmission paths of the first and second arms 22, 24. MZI 10 outputs a combined output optical signal having a measurable intensity that is dependent on the temperature of the MZI 10.

The measured intensity of the output optical signal (which may be a measured optical power) is provided to a processor 32 that operates in response to executable instructions stored in a memory 34. When executed, the instructions cause processor 32 to correlate the measured optical signal intensity to the temperature of the system to produce a measured temperature. The measured temperature may be stored in the memory 34 or reported out, e.g., displayed in a display 36 that is coupled to the processor 32. Alternatively, or in addition, the measured temperature may be communicated by the processor 32 to other equipment. In some embodiments, processor 32 may normalize the measured optical signal intensity of the output optical signal by dividing the measured optical signal intensity by the intensity of the input optical signal generated by the optical signal generator 16. The normalized measurement of optical signal intensity is correlated to the temperature of the system and used to produce a measured temperature that is stored or reported.

Figure 1B:
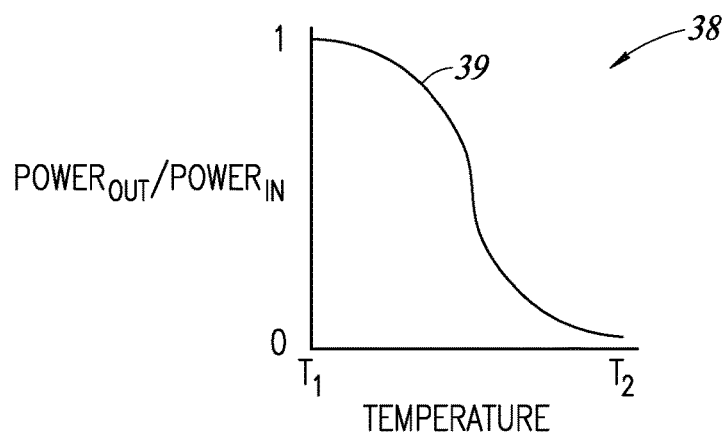
FIG. 1B is a graph showing a correlation between the temperature of the MZI and a normalized measured intensity of the optical signal output by the MZI.

FIG. 1B illustrates a graph 38 that shows one example of a characteristic curve that correlates the normalized measured intensity of the optical signal output by the MZI 10 with the temperature of the system. In FIG. 1B, the normalized measured intensity varies between 1 and 0. At a normalized value of 1, the relative phase of the optical beams transmitted through the first and second arms 22, 24 of the MZI 10 combine in the beam combiner 26 with complete constructive interference. At a normalized value of 0, the relative phase of the optical beams transmitted through the first and second arms 22, 24 combine with complete destructive interference. In the example illustrated in FIG. 1B, the MZI 10 is constructed such that when the temperature of the MZI 10 is at first (e.g., low) temperature $T_1$, the normalized measurement of optical signal intensity is 1 (or close thereto), and when the temperature of the MZI 10 is at a second (e.g., high) temperature $T_2$, the normalized measurement of optical signal intensity is 0 (or close thereto). When the normalized measurement of optical signal intensity is a fraction between 1 and 0, the normalized measurement indicates a system temperature that is between $T_1$ and $T_2$ according to the characteristic curve 39 as shown. The characteristic curve 39 may be generated by calibration of the system in which the temperature of the MZI 10 is set at known temperatures, and the intensities of optical signals that are output by the MZI 10 at the known temperatures are measured, normalized, and recorded in correlation with the known temperatures.

Figure 2:
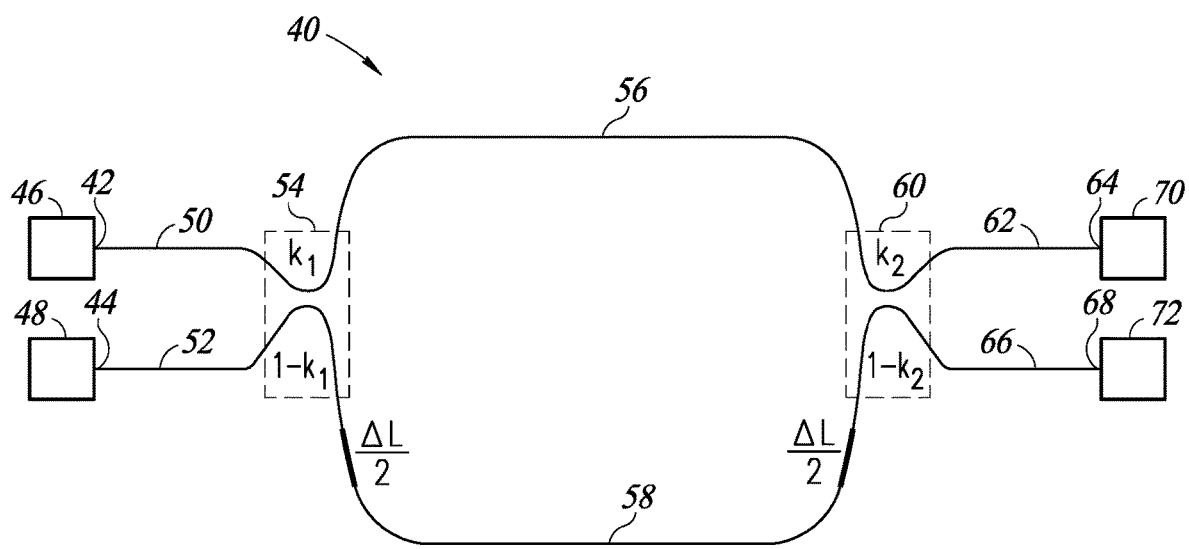
FIG. 2 is a schematic diagram of another temperature measurement system that includes a Mach-Zehnder interferometer (MZI) that detects temperature according to the principles of the present disclosure.

FIG. 2 is a schematic diagram illustrating another example of a system that includes a Mach-Zehnder interferometer (MZI) 40 usable to detect temperature according to principles of the disclosure herein. Whereas the MZI 10 of FIG. 1A includes a beam splitter 20 and a beam combiner 26 comprised of optical Y-junction couplers, the MZI 40 of FIG. 2 uses directional couplers to split and combine the optical beams that propagate through the arms of the MZI.

In FIG. 2, the MZI 40 has a first optical signal input 42 and a second optical signal input 44. Depending on the particular configuration of the MZI 40, the first optical signal input 42 may be coupled to a first optical signal generator 46, or the second optical signal input 44 may be coupled to a second optical signal generator 48. Optical signals that are input to the MZI 40 at the first or second optical signal inputs 42, 44 propagate along respective waveguides 50, 52 that provide optical transmission paths from the optical signal inputs 42, 44 to a directional coupler 54. As will be appreciated below, FIG. 2 illustrates a general case that includes the first and second optical signal generators 46, 48. In some embodiments, only one of the first or second optical signal generators 46, 48 may be coupled to one of the first or second optical signal inputs 42, 44, while the other of the first or second optical signal inputs is not coupled to an optical signal generator.

The directional coupler 54 includes transmission paths that are brought into close proximity such that a portion of the signal power of an optical signal in one of the transmission paths is optically coupled into the other of the transmission paths, and vice versa. In this manner, the directional coupler 54 uses near field coupling to cause a mixing of the optical signals received from the respective waveguides 50, 52. The transmission path that connects the waveguide 50 to the first arm 56 of the MZI 40 has a near field coupling coefficient $k_1$, and the transmission path that connects the waveguide 52 to the second arm 58 of the MZI 40 has a near field coupling coefficient of $1-k_1$. If the coupling coefficient $k_1$ equals 0.5, the directional coupler 54 is a 50:50 coupler such that half of the optical signal power of the optical signal in each of the transmission paths mixes with the other half of the optical signal power in the other of the transmission paths.

By way of example, FIG. 2 may be considered to illustrate a particular embodiment in which the first optical signal input 42 receives no optical signal (i.e., the input is zero or has a zero intensity or power), while the second optical signal input 44 receives an optical signal having an intensity (optical power) of $E_0$. If the coupling coefficient $k_1$ equals 0.5, the directional coupler 54 acts as a beam splitter in which half of the signal power $E_0$ of the input optical signal is coupled into the waveguide, forming the first arm 56 of the MZI 40, and the other half of the signal power $E_0$ remains in the waveguide forming the second arm 58.

Thereafter, the two optical beams in the first and second arms 56, 58 of the MZI 40 propagate along the respective waveguides to a second directional coupler 60. Similar to the MZI 10 in FIG. 1A, the first arm 56 provides an optical transmission path that has a length of length L, while the second arm 58 provides an optical transmission path that is longer and has a length of length $L+\Delta L$.

Similar to the first directional coupler 54, the second directional coupler 60 includes transmission paths that are brought into close proximity such that the signal power of the optical beam in one of the transmission paths is coupled into the other of the transmission paths, and vice versa. Near field coupling in the directional coupler 60 thus causes a mixing of the optical beams that are received from the first and second arms 56, 58 of the MZI 40.

In the directional coupler 60, the transmission path that connects the first arm 56 of the MZI 40 to the output waveguide 62 has a near field coupling coefficient $k_2$, and the transmission path that connects the second arm 58 of the MZI 40 to the output waveguide 66 has a near field coupling coefficient $1-k_2$. Similar to the first directional coupler 54, if the coupling coefficient $k_2$ of the second directional coupler 60 equals 0.5, the directional coupler 60 is a 50:50 coupler in which the optical beams received from the two arms 56, 58 mix equally and produce respective optical output signals that propagate along the waveguides 62, 66 to respective first and second optical signal outputs 64, 68. In this manner, the directional coupler 60 acts as a combiner of the optical beams that traverse the first and second arms 56, 58 of the MZI 40.

The directional coupler 60 (or alternatively, for example, a multimode interference coupler) receives the optical beams transmitted through the first and second arms 56, 58, which arrive at the coupler 60 with different phase, due to the different transmission paths of the first and second arms 56, 58. By using a directional coupler (as compared to a Y-junction), the MZI 40 can generate output optical signals respectively at the first and second optical signal outputs 64, 68 having cosine-shape or sine-shape characteristic curves with a different phase (i.e., with $\pi/2$ phase difference, for example, between the signal outputs that is generated in the coupler 60 and not generated by the transmission paths of the first and second arms 56, 58). This can be advantageous, at least in two ways: (1) the signal output 64, 68 influenced most by the arm 56 or 58 with the largest sensitivity to the temperature change (i.e., the largest derivative of signal intensity to temperature change) can be selected for the temperature measurement; and (2) the optical beam outputs of the two arms 56, 58 can be mutually divided to achieve a tangent/cotangent form function, which can increase the sensitivity to temperature. These advantages may also be realized through the application of two or more MZIs as well, as described below.

The waveguides 50, 52, 62, 66 may be any length as needed, or even omitted such that optical signal(s) are directly input to the directional coupler 54, and the directional coupler 60 directly outputs combined optical signals to one or more optical signal detectors.

The first optical signal output 64 may be coupled to a first optical signal detector 70 that receives the optical signal output from the directional coupler 60 via the waveguide 62. Alternatively, or in addition, a second optical signal detector 72 may be coupled to the second optical signal output 68 and receive the optical signal output from the directional coupler 60 via the waveguide 66. The first or second optical signal detectors 70, 72 detect the intensity of the output optical signals propagating respectively on the waveguides 62, 66. In various embodiments, the optical signal detectors 70, 72 may be photodetectors configured to detect the intensity of the respective output optical signals. The intensity of the output optical signals may be measured by measuring, for example, the optical power of the output optical signals per unit area of the respective optical signal detectors 70, 72 (e.g., in W/cm$^2$).

As shown with the MZI 10 in FIG. 1A, the transmission path of the second arm 58 of the MZI 40 in FIG. 2 is longer than the transmission path of the first arm 56 by the length $\Delta L$. This difference in length of the transmission paths produces a relative phase difference in the optical beams that the directional coupler 60 receives from the first and second arms 56, 58. Depending on the relative phase difference of the two optical beams, the optical beams combine in the directional coupler 60 with constructive interference or destructive interference, or with an intermediate amount of interference.

With the present disclosure, it is not necessary to couple both of the optical signal detectors 70, 72 to the first and second optical signal outputs 64, 68. The temperature of the MZI 40 is detectable using an optical signal intensity measured by only one optical signal detector 70 or 72 coupled to one of the first optical signal output 64 or the second optical signal output 68. The intensity of both optical signals output via the first and second optical signal outputs 64, 68 varies according to the temperature of the MZI 40, and a measurement of either optical signal output can be correlated, e.g., by a processor (not shown) similar to the processor 32 shown in FIG. 1A, to the temperature of the MZI 40 using a characteristic curve such as the curve 39 shown in FIG. 1B. As noted previously, the characteristic curve 39 may be generated by calibration of the temperature measurement system using transmission of an input optical signal through the interferometer (here, MZI 40) at known temperatures and recording corresponding measurements of the optical signal intensities of the output optical signal at the known temperatures. In some embodiments, the accuracy of the detected and reported temperature may be improved by coupling both optical signal detectors 70, 72 to the respective first and second optical signal outputs 64, 68, and using measurements of both of the output optical signals to determine the temperature of the MZI 40.

In various embodiments, for improved temperature measurement sensitivity, the temperature measurement system may include one or more additional phase shifting elements that shift the phase of at least one of the optical signals at the first or second optical signal output 64, 68 relative to the other optical signal output. The phase-shifting element(s) may be incorporated into either (or both) the directional couplers 54, 60, or at other positions in one of the optical transmission paths so as to produce an optical signal output having a characteristic curve that is different than the characteristic curve for the other optical signal output. Having outputs with different characteristic curves enables the temperature measurement system to produce output optical signals having a different temperature sensitivity at a given temperature.

Figure 3:
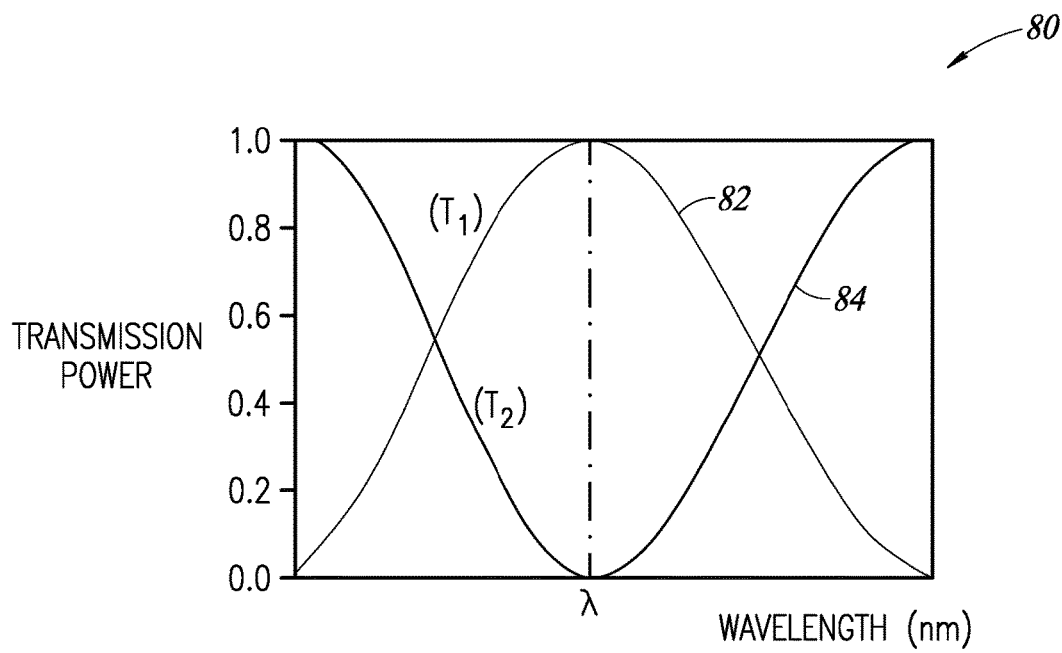
FIG. 3 is another graph showing the temperature dependency of the optical signal output from an MZI as described herein.

FIG. 3 is another graph 80 illustrating, for one example embodiment, the temperature dependency of the optical signal output from a Mach-Zehnder interferometer such as the Mach-Zehnder interferometers 10, 40 described above. Additionally, graph 80 shows how the normalized output optical intensity (ratio of output power to input power) depends on the wavelength of the input optical signal. In FIG. 3, a characteristic curve 82 illustrates the normalized transmission power output for an MZI at first (e.g., low) temperature $T_1$, while a characteristic curve 84 illustrates the normalized transmission power output for the MZI at a second (e.g., high) temperature $T_2$. As can be seen, at each of the two temperatures, the normalized transmission power of the MZI output varies depending on the wavelength of the input optical signal. Using a narrowband (e.g., single wavelength) laser that inputs an optical signal into the MZI, for example, at wavelength $\lambda$, the normalized transmission power output shown in graph 80 corresponds with the example illustrated in graph 38 of FIG. 1B. At an MZI temperature of $T_2$, the normalized transmission power output is approximately 0, while at an MZI temperature of $T_1$, the normalized transmission power output is approximately 1.

On a theoretical level, the ratio of output optical power to input optical power of an MZI as described herein may be calculated according to Equation 1 as follows:

$$\frac{P_1}{P_0} = \left( \alpha_1 k_1 k_2 + \alpha_2 (1-k_1)(1-k_2) + 2\sqrt{\alpha_1 \alpha_2 k_1 k_2 (1-k_1)(1-k_2)} \cos\left(\frac{2\pi}{\lambda} n_{\text{eff}}(T) \Delta L\right) \right)$$

In Equation 1, $P_0$ is the input optical power, $P_1$ is the output optical power, $n_{\text{eff}}$ is the effective refractive index of the waveguides in the MZI, and $\Delta L$ is the difference in length of two arms of the MZI. The coupling coefficients of the transmission paths of the directional couplers are $k_1$ and $k_2$. The transmission coefficients of MZI arms are $\alpha_1$, and $\alpha_2$. Assuming $\alpha_1 = \alpha_2 = 1$ (i.e., no absorption in the transmission lines) and assuming $k_1 = k_2 = 0.5$ (i.e., a 50:50 directional coupler), Equation 1 simplifies to:

$$\frac{P_1}{P_0} = \frac{1}{2} + \frac{1}{2} \cos\left(\frac{2\pi n_{\text{eff}}(T)}{\lambda} \Delta L\right)$$

Variable characteristics of components in the temperature measurement systems described herein may result in a certain amount of temperature uncertainty in the measured temperature.

To improve temperature determination, additional interferometers and corresponding photodetectors are added in some embodiments. Different interferometers may be configured differently or configured to be different from each other (e.g., by phase delay) so that they may have different characteristic curves and can provide different levels of temperature sensitivities or resolutions. The multiple interferometers may be multiple MZIs that are each constructed in accordance with the MZIs 10, 40 shown in FIGS. 1A and 2. Such multiple MZIs may be constructed on the same chip and help increase the resolution, sensitivity (responsivity), and accuracy of the MZI thermometer.

In some embodiments, these additional interferometers would be constructed to have different phase relationships such that their relative maxima or minima occur at different temperatures. By way of example, two interferometers may be configured as 90 degrees out of phase. This phase shift leads to a translation of the characteristic curve to the left or right in some embodiments when the characteristic curve is in a cosine-shaped or sine-shaped form.

In some embodiments, each interferometer has a different free spectral range. For example, in at least one embodiment, the temperature measurement system may include three MZIs, where one MZI with a large free spectral range (having a wider range input-output characteristic curve) is used to roughly estimate the temperature and two MZIs with a smaller free spectral range (having narrower range input-output characteristic curves) are used for higher precision temperature measurement within the temperature range estimated by the first MZI. The two MZIs with the narrower range input-output characteristic curves are arranged with a relative phase difference (e.g., a 90-degree phase difference) between the two MZIs. Together, in this example, the three MZIs provide for higher temperature measurement accuracy. In some embodiments, the multiple interferometers may include one or more MZIs, MIs, or any other interferometers.

In the following embodiment, the first interferometer is configured to serve as a coarse sensor to cover a coarse temperature range, which may be understood to provide the first-level or first-digit information of the temperature measurement. The second interferometer is configured to serve as a finer sensor to differentiate different temperature ranges within the coarse temperature range. The period of the sine curve of the second interferometer is configured to be narrower than the period of the sine curve of the first interferometer, e.g., only one-tenth. In this way, using the disclosed technology, the second-level or second-digit information of the temperature measurement can be obtained.

In another embodiment, intensity information of a wider range interferometer and wavelength information of a narrower range interferometer are utilized together to achieve higher resolution temperature measurements. For example, a coarse temperature range may be estimated based on the optical signal intensity of an output optical signal of a wider range interferometer and its corresponding characteristic curve, as disclosed previously. Next, a finer temperature range within the coarse temperature range may be determined based on the frequency/wavelength of the peak or dip of the narrower range interferometer. In this way, a higher temperature resolution with multiple levels of temperature measurement can be obtained.

In one embodiment, the higher resolution temperature is determined based on the reading (e.g., period counts or periods) of the second interferometer and respective characteristic curves of both interferometers. Further, other embodiments can obtain even higher precision information or the greater resolution of the temperature measurement by adding more interferometers. As such, the disclosed technology increases the sensitivity, precision, or resolution of such temperature detection chips.

In systems that employ two or more interferometers, the interferometers are preferably constructed on the same chip and operate in parallel. The two more interferometers may receive the same input optical signal (e.g., an optical signal from a single optical signal generator that is split by a beam splitter) and measure the intensities of the respective output optical signals, which are respectively correlated to the temperature of the system. A reference arm, e.g., as shown and described below in reference to FIG. 4, may be associated with one or more of the multiple interferometers to normalize the measured output optical signals from the multiple interferometers. Each of the multiple interferometers may operate similar to or in the same manner as described herein with reference to MZIs 10, 40, or MI 100.

As can be seen in FIG. 3, when an input optical signal of wavelength λ is used, the slope of the characteristic curves 82, 84 substantially decreases around the temperatures of $T_1$ and $T_2$, respectively. If a system employs at least two MZIs, where the relative maximum optical signal transmissivity at a given temperature for one MZI is shifted (e.g., by 90 degrees) as to the other MZI, greater sensitivity to differences in temperature over a wider range of temperatures may be achieved. For example, at a given temperature T and input optical signal wavelength λ, the slope of the characteristic curve for one MZI may be substantially larger than for the other MZI. At that given temperature T and input signal wavelength λ, the MZI having a characteristic curve with a higher slope is more sensitive to smaller differences in the temperature. At a different given temperature (and same input signal wavelength), the same MZI may have a lower slope characteristic curve while the other MZI has a higher slope characteristic curve. In some embodiments, a higher slope relates to a shorter period of the characteristic curve. Conversely, a lower slope relates to a longer period of the characteristic curve. A greater sensitivity or a higher resolution to temperature differences across a wide range of temperatures may be achieved using two or more interferometers.

Figure 4:
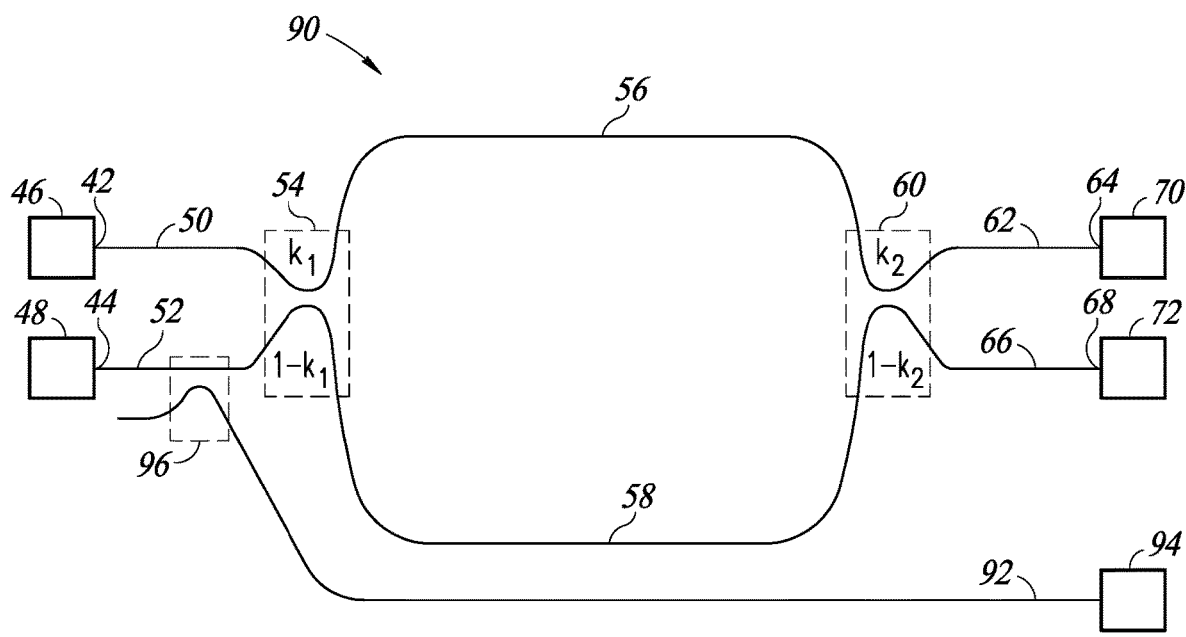
FIG. 4 is a schematic diagram of a temperature measurement system that provides greater sensitivity to input power fluctuation by including a reference arm with the MZI.

Power fluctuation in the input optical signal(s) may affect the determination of temperature in the above systems. Sensitivity to power fluctuation in the above embodiments may be minimized by adding a reference arm, such as illustrated in FIG. 4, and evaluating the measured intensity of the interferometer output signal in the context of a measured intensity of the optical signal output by the reference arm. Measurement of output signal intensity on the reference arm can be used to normalize the output signal intensity from the interferometer (or interferometers) of the system. In this manner, the temperature of the system may be determined with little to no sensitivity to fluctuations in the input signal power.

In the example shown in FIG. 4, the system employs an MZI 90 that is similar to, or the same as, the MZI 40 shown in FIG. 2. In addition to measuring the optical signal intensity of the optical signals that are output on one or both of the optical signal outputs 64, 68, the system may further include a waveguide forming a reference arm 92 operating in parallel to the MZI 90. Preferably, the reference arm 92 is a waveguide constructed on the same chip as the MZI 90 and is coupled to an optical signal detector 94 that measures the intensity of the optical signal propagated through the reference arm 92. The reference arm 92 receives the same input optical signal that is input to the MZI 90. The reference arm 92 may be coupled to the waveguide 52 (e.g., by a directional coupler 96 that provides near field coupling) and receive a portion of the optical signal power of the optical signal that is generated by the optical signal generator 48. Alternatively, other forms of beam splitting (on-chip or off-chip) may be used to direct portions of the generated optical signal to both the input of the MZI 90 and the input of the reference arm 92, without coupling the reference arm 92 to the waveguide 52. In such an alternative arrangement, the reference arm 92 does not pass near the waveguide 52 in a coupler 96, as shown in FIG. 4, but instead receives a portion of the input optical signal from elsewhere on or off-chip from the MZI 90.

The reference arm 92 does not need any temperature or other environmental control since the output signal intensity measurement of reference arm 92 is used to normalize the output signal intensity measurement of the MZI 90. The normalized output signal measurement may be calculated by dividing the output signal measurement of the MZI 90 by the output signal measurement of the reference arm 92. The temperature is determined, e.g., by a processor (not shown) similar to the processor 32 shown in FIG. 1A, by correlating the normalized output signal measurement with temperature according to a characteristic curve, e.g., as illustrated by curve 39 shown in FIG. 1B. The characteristic curve may be represented by a mathematical function, a look-up table, or the like stored in memory (e.g., memory 34 in FIG. 1A), which relates output signal measurements to temperatures.

For example, the characteristic curve may be represented by a look-up table, and the processor is configured to correlate the measured optical signal intensity of the interferometer with the temperature by using the measured optical signal intensity as an index to the look-up table to determine the temperature. In embodiments where the characteristic curve is represented by a mathematical function, the processor may be configured to correlate the measured optical signal intensity of the interferometer with the temperature by calculating the temperature according to the mathematical function using the measured optical signal intensity.

FIG. 5 is a chart illustrating a non-limiting variety of optical junctions or directional couplers that may be used in embodiments of the present disclosure to split or combine optical signal(s) that are incident on the junctions or couplers. For example, in FIG. 5, schematics (a), (e), and (f) illustrate forms of Y-junctions having suitable characteristics for use in splitting or combining optical signals, while schematics (b), (c), and (d) illustrate couplers providing suitable near field coupling to split or combine optical signals, depending on the direction of propagation of the optical signal(s) to be split or combined. Embodiments of the disclosure may also use one or more multimode interference couplers, e.g., with two inputs and two outputs as shown in the schematic (g), to split or combine optical signals.

Figure 6:
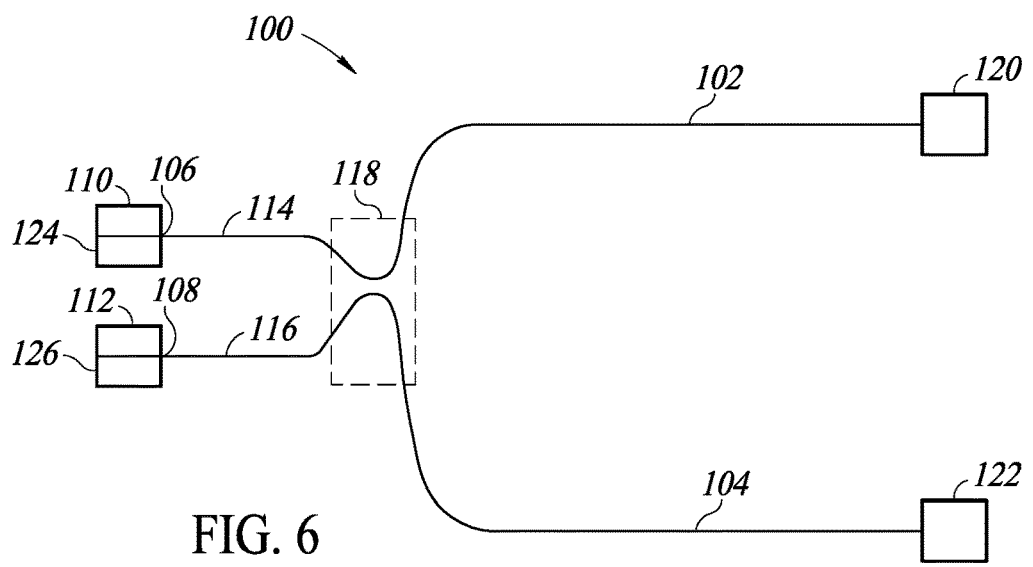
FIG. 6 is a schematic diagram of a temperature measurement system using a Michelson interferometer (MI) to determine temperature according to the principles of the present disclosure.

FIG. 6 is a schematic diagram illustrating yet another example of a system that uses an optical interferometer for the measurement of temperature. The system in FIG. 6 includes a Michelson interferometer (MI) 100 that uses the reflection of optical signals propagating in different length waveguides that form first and second arms 102, 104 of the MI 100. The MI 100 has the first optical signal input and output 106 and the second optical signal input and output 108. Depending on the particular configuration of the MI 100, the first optical signal input/output 106 may be coupled to a first optical signal generator 110, or the second optical signal input/output 108 may be coupled to a second optical signal generator 112.

Optical signal(s) that are input to the MI 100 at the first or second inputs 106, 108 propagate along respective waveguides 114, 116 that provide transmission paths from the optical signal input/outputs 106, 108 to a directional coupler 118. In some embodiments, only one of the first or second optical signal generators 110, 112 may be coupled to a first or second optical signal input/output 106, 108, while the other of the first or second optical signal input/output 106, 108 is not coupled to an optical signal generator.

The directional coupler 118 includes transmission paths that provide near field coupling of the signal power of the optical signals propagating in the transmission paths, producing a mixing of the optical signals in the directional coupler 118. The directional coupler 118 has a near field coupling coefficient $k_1$, and if $k_1$ equals 0.5, the directional coupler 118 is a 50:50 coupler similar to the directional couplers 54, 60 discussed with regard to FIG. 2. In such case, for an input optical signal, the directional coupler 118 acts as a beam splitter that couples half of the signal power of the input optical signal to an optical beam propagating in the first arm 102 of the MI 100, and the other half of the signal power is propagated in an optical beam propagating in the second arm 104. Similar to the MZI 10 in FIG. 1A, the first arm 102 of the MI 100 provides an optical transmission path that has a length of length L, while the second arm 104 provides an optical transmission path that is longer and has a length of length L+ΔL.

The first arm 102 of the MI 100 is coupled to a first reflector 120 that reflects the incoming optical beam propagating through the first arm 102. The second arm 104 of the MI 100 is coupled to a second reflector 122 that reflects the incoming optical beam propagating through the second arm 104. The reflected optical beams return to the directional coupler 118 via the first and second arms 102, 104, albeit with a phase differential due to the different path lengths of the first and second arms 102, 104. The directional coupler 118 uses near field coupling to mix the returning reflected optical beams to produce combined output signals that are propagated to the first and second input/outputs 106, 108.

The first optical signal input/output 106 may be coupled to a first optical signal detector 124 that receives the optical signal output from the directional coupler 118 via the waveguide 114. Alternatively, or in addition, a second optical signal detector 126 may be coupled to the second optical signal input/output 108 and receive the optical signal output from the directional coupler 118 via the waveguide 116. The first and/or second optical signal detectors 124, 126, which may be photodetectors, detect the intensity of the output optical signals by measuring, for example, the optical power of the output optical signals per unit area of the respective optical signal detectors (e.g., in W/cm²).

As shown with the MZI 10 (FIG. 1A) and MZI 40 (FIG. 2), the transmission path of the second arm 104 of the MI 100 in FIG. 6 is longer than the transmission path of the first arm 102 by the length ΔL. The principle of operation of the MI is similar to the earlier described MZIs. This difference in length of the first and second arms 102, 104 produces a relative phase difference in the optical beams that the directional coupler 118 receives from the first and second reflectors 120, 122 via the first and second arms 102, 104. Depending on the relative phase difference of the two returning optical beams, the optical beams mix in the directional coupler 118 with constructive or destructive interference.

It is not necessary to couple both of the optical signal detectors 124, 126 to the first and second optical signal input/outputs 106, 108. The temperature of the MI 100 is detectable using a measurement of optical signal intensity obtained by only one optical signal detector 124 or 126 coupled to one of the first or second optical signal input/outputs 106, 108. The intensity of the output optical signals varies according to the temperature of the MI 100, and a measurement of either optical signal output can be correlated, e.g., by a processor (not shown) similar to the processor 32 shown in FIG. 1A, to the temperature of the MI 100 using a characteristic curve of the MI 100, e.g., similar to the characteristic curve 39 shown in FIG. 1B. In other embodiments, the temperature determination may be improved by coupling both of the optical signal detectors 124, 126 to the respective first and second optical signal input/outputs 106, 108, and using measurements of both output optical signals to determine the temperature of the MI 100.

Figure 7:
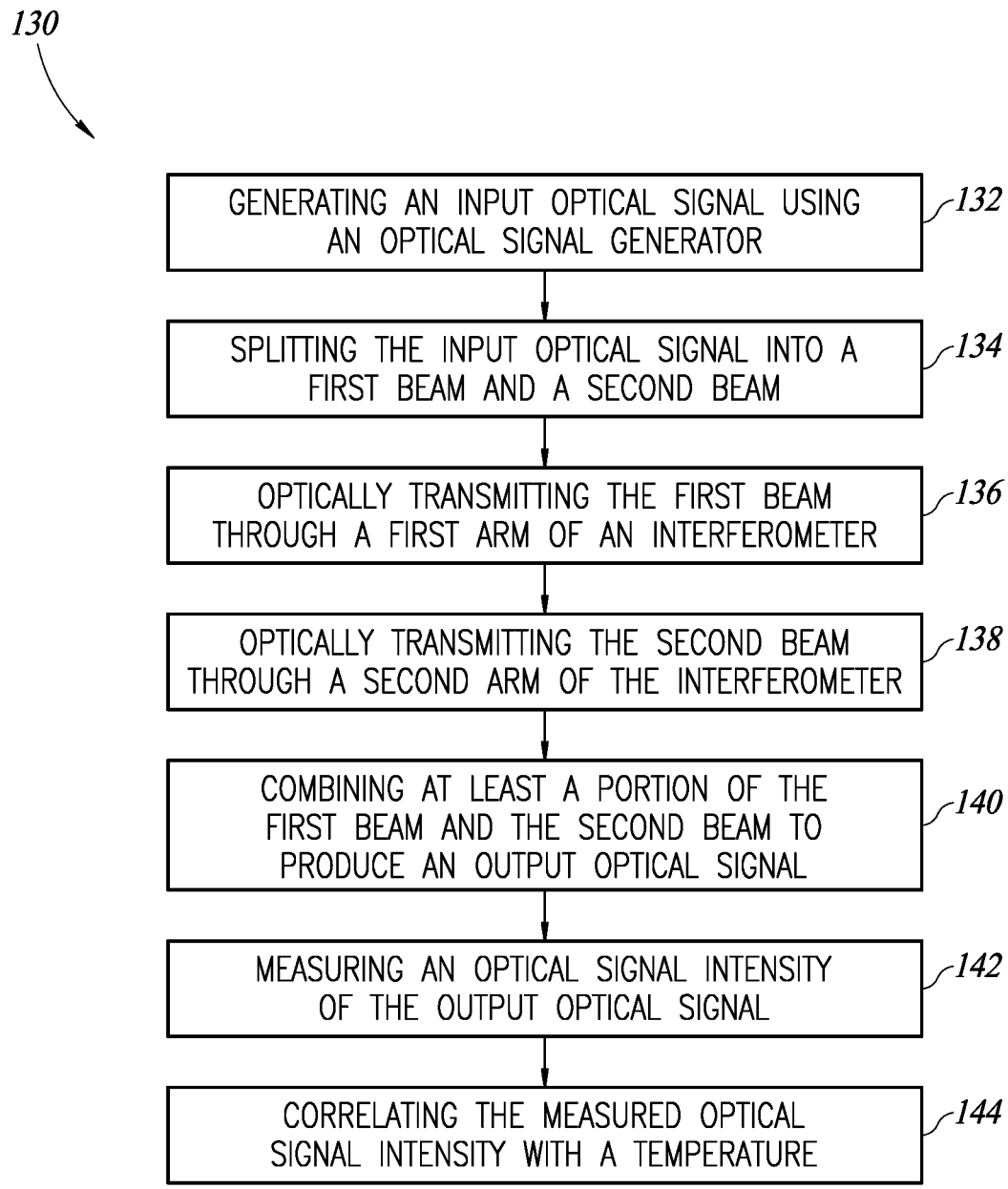
FIG. 7 is a flow diagram of a temperature measurement method according to the present disclosure.

As can be seen with the above-described embodiments, the present disclosure provides methods for the measurement of temperature using an optical interferometer. FIG. 7 is a flow diagram illustrating at least one embodiment of a temperature measurement method 130 of the present disclosure.

Block 132 is to generate an input optical signal at a predetermined wavelength using an optical signal generator, e.g., optical signal generator 16, 46, 48, 110, or 112. In one embodiment, block 132 includes generating the input optical signal at the single wavelength having no tunability or a tunability range of 1 to 4 nanometer.

A temperature-detecting system and method using an optical interferometer, such as a Mach-Zehnder interferometer or a Michelson interferometer, as described herein, has a significant cost advantage over presently-known systems. Typical optical temperature measurement systems require an expensive input laser having a large, tunable wavelength range. Such systems determine the temperature by varying the input optical signal over a wide wavelength range and identifying the input signal wavelength having greater resonance in the system. The identified input wavelength is thereafter correlated with the temperature of the system. With the present disclosure, however, temperature measurement systems can move away from using a large, sensitive laser with, for example, a 70 nm tunability range to a less expensive, compact, more robust narrowband laser having a tunability range of 1-4 nm for example, which costs only a fraction of the price of a large tunable range laser. Embodiments of the present disclosure using a single wavelength laser determine the temperature by evaluating the output optical signal intensity relative to the interferometer's characteristic curve at the input signal wavelength generated by the laser.

Accordingly, as with the optical signal generator 16 of FIG. 1A, or the optical signal generators 46, 48 of FIG. 2, the optical signal generators 110, 112 in FIG. 6 are not required to have a wide wavelength tunability range. In some embodiments, the optical signal generators generate a narrowband laser having a tunability range of, for example, 0.001-4 nm or 1-4 nm centered around an output wavelength.

At block 134, the method involves splitting the input optical signal into a first beam and a second beam, and thereafter optically transmitting the first beam through the first arm of an interferometer and optically transmitting the second beam through a second arm of the interferometer at blocks 136, 138, respectively. As described above, the second arm of the interferometer introduces a phase shift in the second beam relative to the first beam. At block 140, the method involves combining at least a portion of the transmitted first beam and the transmitted phase-shifted second beam to produce an output optical signal.

At block 142, the optical signal intensity of the output optical signal is measured. In some embodiments, this block further includes normalizing the output optical signal intensity of the interferometer by the reference optical signal intensity of the reference arm. For this normalization, additional steps are performed, including transmitting at least a portion of the input optical signal through a reference arm to produce a reference output optical signal and measuring a reference optical signal intensity of the reference output optical signal of the reference arm.

At block 144, the measured optical signal intensity is correlated with a temperature, e.g., using a characteristic curve to produce a measured temperature. As noted previously, a characteristic curve may be obtained by transmitting an input optical signal through the interferometer at known temperatures and recording corresponding measurements of the optical signal intensities of the output optical signal at the known temperatures. In some embodiments, a method for constructing such characteristic curves includes transmitting a calibration optical signal through the interferometer at a plurality of known temperatures, recording optical signal intensities of corresponding output optical signals of the interferometer, and generating the characteristic curve based on the plurality of known temperatures and the corresponding output optical signals.

In a multi-interferometer configuration system, block 142 further includes measuring a second optical signal intensity of a second output optical signal of a second interferometer that receives the input optical signal; and determining a second temperature range based on a second characteristic curve that relates a second range of output optical signal intensities to a second range of temperatures. Meanwhile, block 144 further includes determining a higher resolution temperature based on the first temperature range determined via the first interferometer and the second temperature range determined via the second interferometer. As discussed early, the second temperature range indicates a relative position in the first temperature range, e.g., based on the period counts or periods.

Further, the waveguides used in the optical interferometers described herein, such as MZIs 10, 40, and MI 100, may be constructed of any material of a variety of materials that provide a transmission path for the propagation of light. Such materials may include, without limitation, silicon, silicon nitride, silicon dioxide (a.k.a. silica, oxide, quartz, fused silica), gallium arsenide, sapphire (alumina, aluminum oxide), germanium, fluoride materials, bromide materials, and chloride materials, or any combination thereof.

Moreover, any type of fabrication methods known for constructing the components of the optical interferometers on a chip may be used, such as, without limitation, photolithography, e-beam lithography, embossing, direct pattern writing, 3D printing, film deposition, film growth, and film etching.

It should also be understood that the present disclosure encompasses methods and systems that create a relative phase difference in optical beams that are propagating in two or more interferometer arms. This includes methods and systems that use different dimensions of light paths, geometrical changes of the light paths and their design, different dimensions of waveguides, different materials for different interferometer arms or the environment around them, different thin film, single atomic layer, or multiple atomic layer (2D or 1D) materials around the interferometer arms, different mechanical stress or pressure around the interferometer arms, applying a different temperature on each arm by any passive chip design or active (e.g., microheater) heat mechanism, and any active or passive refractive index variation (e.g., difference of dopants) in the materials forming components of the interferometers.

Embodiments of the present disclosure further encompass methods and systems having variations of chip design that implement the concepts of a Mach-Zehnder interferometer or Michelson interferometer for thermometry. Such variations may include, without limitation, interferometer design variation, variation of waveguide dimensions or waveguide paths, different types of couplers in the propagation of the optical signals (e.g., directional coupler, multimode interference coupler, or Y-junction coupler), or any type of input or output to the chip (e.g., a grating coupler, edge coupling, looped fiber coupling, or tapered fiber).

While exemplary embodiments illustrated and discussed in detail herein refer to using a narrowband laser for optical interferometer thermometry, it is well recognized that electromagnetic radiation spans a massive spectrum. Other suitable embodiments of the invention may employ optical signal generators that generate optical signals in the visible spectrum, near-infrared, mid-infrared, and far-infrared wavelength ranges, for example. Signal generators that generate signals in radio frequencies may be coupled to resonators and used as an "optical signal source" for the optical interferometer thermometry described herein. In some cases, X-Ray and ultra-violet signal generators may be coupled to an MZI and used for the optical interferometer thermometry described herein. Different modes of operation for the optical signal generators may also be used. In many embodiments, the optical signal generator is a continuous-wave narrowband laser. Other forms of signal generators may be used to generate the input optical signal, such as frequency comb sources, broadband sources, pulsed sources, coherent, incoherent (similar to optical coherence tomography), or any other type of light source. Such alternative radiation sources and modes of operation, as adapted for use with the optical interferometer thermometry as described herein, do not depart from the principles of the present disclosure.

Embodiments discussed above may employ multiple optical signal detectors, such as detectors 72, 72, and 94 in FIGS. 2 and 4, or detectors 124, 126 in FIG. 6, for measuring output optical signals. The number of optical signal detectors may further be multiplied in embodiments that use two or more interferometers, as discussed above. In some embodiments, fewer optical signal detectors may be used and connected by one or more multiplexing switches to the various optical signal outputs of the interferometers or reference arms, as may be used in such embodiments. The multiplexing switch(es) and optical signal detector(s) may be constructed on-chip with the interferometer(s) and reference arm(s) or off-chip from the same. Indeed, in various embodiments, some or all of the optical signal generator(s), interferometer(s), and optical signal detector(s) may be constructed on the same chip.

Embodiments of the present disclosure may further be adapted to not only measure the optical signal intensity (power) of the interferometer output but also measuring the slope of the interferometer's characteristic curve at the particular wavelength and measured intensity of the output signal. Evaluating both the measured output optical signal intensity and the curve slope may increase the overall sensitivity of the temperature detection. With slight modulation of the wavelength of the input optical signal, it is possible to determine the slope of the interferometer characteristic curve at the detected intensity. The measured slope provides an additional parameter that helps more precisely correlate the measured signal intensity to the temperature and decreases the uncertainty of the temperature measurement. For example, a ratio of the determined slope over the measured intensity may increase the measurement sensitivity by moving from a cosine term in the calculations (e.g., as in Equation 1 above) to a tangent term. Additionally, these techniques can be combined with lock-in amplification techniques to more accurately measure and evaluate the output optical signal to determine the temperature of the system.

As will be appreciated, the various embodiments described above can be combined to provide yet further embodiments. Aspects of the embodiments can be modified, if necessary, to employ the concepts of the present invention disclosed herein. These and other changes can be made to the embodiments in light of the above-detailed description. In general, in the following claims, the terms used in the specification should not be construed to limit the claims to the specific embodiments disclosed in the specification but should be construed to include all possible embodiments along with the full scope of equivalents to which such claims are entitled. Accordingly, the claims are not limited by the disclosure.

Thus, in view of the foregoing disclosure, various examples of the disclosed systems or methods may include any one or combination of the following features.

These features include an optical signal generator, an interferometer, an optical signal detector, and a processor. The optical signal generator generates an input optical signal at a predetermined wavelength.

The interferometer may be configured as a Mach-Zehnder interferometer or as a Michelson interferometer. The interferometer includes a beam splitter that is coupled to the optical signal generator. The beam splitter receives the input optical signal from the optical signal generator and splits the input optical signal into a first beam and a second beam. The interferometer further includes a first arm that is coupled to the beam splitter to receive and optically transmit the first beam, and a second arm that is coupled to the beam splitter to receive and optically transmit the second beam, wherein the second arm introduces a phase shift in the second beam relative to the first beam. The interferometer further also includes a beam combiner that is coupled to the first arm and the second arm. The beam combiner receives the first beam and the phase-shifted second beam and combines at least a portion of the first beam and the phase-shifted second beam to produce an output optical signal.

The optical signal detector is coupled to the beam combiner and measures the optical signal intensity of the output optical signal. The processor is coupled to the optical signal detector and receives the measured optical signal intensity. The processor correlates the optical signal intensity with a temperature to produce a measured temperature.

The interferometer includes a first waveguide that forms the first arm and a second waveguide that forms the second arm. The second arm introduces a phase shift in the light beam that it carries relative to the light beam that is carried by the first arm. The second waveguide provides an optical transmission path for the second beam that is longer than an optical transmission path provided by the first waveguide for the first beam. A difference in the material used to construct the first arm and the second arm may produce the relative phase shift in the light beams carried by the first and second arms. A difference in stress, strain, or doping of the second arm as compared to the first arm may introduce the relative phase shift.

The processor correlates the measured optical signal intensity with the temperature according to a characteristic curve that relates the measured optical signal intensity to the temperature. The characteristic curve may be generated by calibrating the temperature measurement system, e.g., by transmitting an input optical signal through the interferometer at known temperatures and recording corresponding measurements of the optical signal intensities of the output optical signal at the known temperatures.

The characteristic curve may be represented by a look-up table, and the processor correlates the measured optical signal intensity of the interferometer with the temperature by using the measured optical signal intensity as an index to the look-up table to determine the temperature. The characteristic curve is represented by a mathematical function, and the processor correlates the measured optical signal intensity of the interferometer with the temperature by calculating the temperature according to the mathematical function using the measured optical signal intensity.

At least two output optical signals may be produced. One or more phase-shifting elements may be used to shift the phase of at least one output optical signal relative to the other output optical signal(s) so that the respective characteristic curves of the output optical signals are shifted in phase with respect to each other. Thus, at any given temperature, the different characteristic curves of the output optical signals reflect a different temperature sensitivity (i.e., change of output signal intensity per change in temperature).

The system may incorporate two or more interferometers. In such embodiments, a first interferometer produces an output optical signal at a measured first optical signal intensity, while a second interferometer produces an output optical signal at a measured second optical signal intensity. The second interferometer includes a first arm that receives and optically transmits a portion of the input optical signal as a first beam, and a second arm that receives and optically transmits a portion of the input optical signal as a second beam. As with the first interferometer, the second arm of the second interferometer introduces a phase shift in the second beam relative to the first beam, and the transmitted first beam and phase-shifted second beam combine to produce an output optical signal. An optical signal detector measures the optical signal intensity of the output optical signal of the second interferometer and produces a measured second optical signal intensity.

The processor receives the measured first optical signal intensity of the first interferometer and the measured second optical signal intensity of the second interferometer, and correlates both the first and second optical signal intensities with a temperature to produce the measured temperature.

The first and second interferometers may each have a respective characteristic curve that relates the measured first and second optical signal intensities to the temperature. In such a case, the processor correlates both the first optical signal intensity of the first interferometer and the second optical signal intensity of the second interferometer with the temperature according to the respective characteristic curves. At any given temperature, the characteristic curve of the first interferometer may have a slope reflecting a temperature sensitivity (i.e., change of output signal intensity per change in temperature) that is different than the temperature sensitivity of the second interferometer. The characteristic curve of the second interferometer may be shifted in phase relative to the characteristic curve of the first interferometer, such that, for any given temperature, the input optical signal transmitted through the first and second interferometers produces respective output optical signals having different measured optical signal intensities.

The temperature measurement system may further include a reference arm through which at least a portion of the input optical signal is transmitted to produce an output optical signal. An optical signal detector coupled to the reference arm receives the output optical signal and measures an optical signal intensity of the output optical signal. The measured optical signal intensity of the interferometer or interferometers is normalized by the measured optical signal intensity of the reference arm.

Other features include generating an input optical signal at a predetermined wavelength using an optical signal generator; splitting the input optical signal into a first beam and a second beam; optically transmitting the first beam through a first arm of an interferometer; optically transmitting the second beam through a second arm of the interferometer, wherein the second arm of the interferometer introduces a phase shift in the second beam relative to the first beam; combining at least a portion of the first beam and the phase-shifted second beam to produce an output optical signal; measuring an optical signal intensity of the output optical signal; and correlating the measured optical signal intensity with a temperature to produce a measured temperature. In various embodiments, the second arm of the interferometer provides an optical transmission path for transmitting the second beam that is longer than an optical transmission path provided by the first arm for transmitting the first beam.

Other features include correlating the measured optical signal intensity with a temperature according to a characteristic curve that relates a range of output optical signal intensities to a range of temperatures. The characteristic curve may be generated by transmitting the input optical signal through the interferometer at known temperatures and recording corresponding measurements of the optical signal intensities of the output optical signal at the known temperatures.

Other features include measuring temperature using two or more interferometers in which, for example, a first interferometer produces an output optical signal at a measured first optical signal intensity and a second interferometer produces an output optical signal at a measured second optical signal intensity; correlating both the measured first optical signal intensity and the second optical signal intensity with a temperature to produce the measured temperature. The first optical signal intensity and the second optical signal intensity may be correlated with the temperature according to respective characteristic curves of the first and second interferometers that respectively relate the first and second optical signal intensities to the temperature. In various embodiments, the characteristic curve of the second interferometer is phase-shifted relative to the characteristic curve of the first interferometer, such that the input optical signal transmitted through the first and second interferometers produces respective output optical signals having different measured optical signal intensities.

Other features include transmitting at least a portion of the input optical signal through a reference arm to produce an output optical signal; measuring an optical signal intensity of the output optical signal of the reference arm; and normalizing the measured output optical signal intensity of the interferometer by the measured optical signal intensity of the reference arm.

The invention claimed is:

1. A temperature measurement system on a chip, comprising:
    an optical signal generator configured to generate an input optical signal at a predetermined wavelength;
    an interferometer that includes:
        a beam splitter configured to split the input optical signal into a first beam and a second beam;
        a first arm coupled to the beam splitter to receive and optically transmit the first beam;
        a second arm coupled to the beam splitter to receive and optically transmit the second beam, wherein the second arm introduces a phase shift in the second beam relative to the first beam to produce a phase-shifted second beam; and
        a beam combiner coupled to the first arm and the second arm, wherein the beam combiner is configured to receive the first beam and the phase-shifted second beam and combine at least a portion of the first beam and the phase-shifted second beam to produce an output optical signal;
    an optical signal detector coupled to the beam combiner, wherein the optical signal detector is configured to measure an optical signal intensity of the output optical signal and produce a measured optical signal intensity of the interferometer;
    a reference arm through which at least a portion of the input optical signal is transmitted to produce a reference output optical signal; and
    an optical signal detector coupled to the reference arm to receive the reference output optical signal and measure an optical signal intensity of the reference output optical signal to produce a measured optical signal intensity of the reference arm,
    wherein the measured optical signal intensity of the interferometer is normalized by the measured optical signal intensity of the reference arm to produce a normalized measured optical signal intensity of the interferometer; and
    a processor configured to correlate the normalized measured optical signal intensity of the interferometer with a temperature.

2. The temperature measurement system according to claim 1, wherein the interferometer includes a first waveguide that forms the first arm and a second waveguide that forms the second arm, and wherein the second waveguide provides an optical transmission path for the second beam that is longer than an optical transmission path provided by the first waveguide for the first beam.

3. The temperature measurement system according to claim 1, wherein the processor is configured to correlate the measured optical signal intensity of the interferometer with the temperature according to a characteristic curve that relates the measured optical signal intensity of the interferometer to the temperature.

4. The temperature measurement system according to claim 3, wherein the characteristic curve is represented by a look-up table, and the processor is configured to correlate the measured optical signal intensity of the interferometer with the temperature by using the measured optical signal intensity as an index to the look-up table to determine the temperature.

5. The temperature measurement system according to claim 3, wherein the characteristic curve is represented by a mathematical function, and the processor is configured to correlate the measured optical signal intensity of the interferometer with the temperature by calculating the temperature according to the mathematical function using the measured optical signal intensity.

6. The temperature measurement system according to claim 3, wherein the beam combiner produces at least two output optical signals having respective characteristic curves, the temperature measurement system further comprising a phase-shifting element that introduces a phase difference between the at least two output optical signals such that, at a given temperature, the respective characteristic curves of the at least two output optical signals provide different temperature measurement sensitivity.

7. The temperature measurement system according to claim 1, wherein the interferometer is a first interferometer that produces an output optical signal at a measured first optical signal intensity of the first interferometer, the temperature measurement system further comprising a second interferometer that includes a first arm configured to receive and optically transmit a portion of the input optical signal as a first beam, and a second arm configured to receive and optically transmit a portion of the input optical signal as a second beam, wherein the second arm introduces a phase shift in the second beam relative to the first beam to produce a phase-shifted second beam of the second interferometer, and wherein the first beam and phase-shifted second beam of the second interferometer combine to produce an output optical signal;

wherein an optical signal detector is configured to measure an optical signal intensity of the output optical signal of the second interferometer and produce a measured second optical signal intensity of the second interferometer; and wherein the processor is configured to receive the measured first optical signal intensity of the first interferometer and the measured second optical signal intensity of the second interferometer and correlate both the measured first and second optical signal intensities of the respective first and second interferometers with the temperature.

8. The temperature measurement system according to claim 7, wherein the first and second interferometers have respective characteristic curves that relate the measured first and second optical signal intensities to the temperature, and wherein the processor is configured to correlate both the measured first and second optical signal intensities of the respective first and second interferometers with the temperature according to the respective characteristic curves.

9. The temperature measurement system according to claim 8, wherein the characteristic curve of the second interferometer is phase-shifted relative to the characteristic curve of the first interferometer, such that for any given temperature the input optical signal transmitted through the first and second interferometers produces respective output optical signals having different measured optical signal intensities.

10. The temperature measurement system according to claim 8, wherein, at a given temperature, the respective characteristic curves of the first and second interferometers have a different slope, providing different temperature sensitivity at the given temperature.

11. The temperature measurement system according to claim 1, wherein the reference arm is coupled to receive the portion of the input optical signal separate from a coupling of the input optical signal to the interferometer.

12. The temperature measurement system according to claim 1, wherein the reference arm operates without temperature control, and the normalized measured optical signal intensity of the interferometer is calculated by dividing the measured optical signal intensity of the interferometer by the measured optical signal intensity of the reference arm.

13. A method for measuring temperature, comprising:
providing an input optical signal at a single wavelength to an interferometer;
measuring an optical signal intensity of an output optical signal of the interferometer;
transmitting at least a portion of the input optical signal through a reference arm to produce a reference output optical signal;
measuring a reference optical signal intensity of the reference output optical signal of the reference arm; and
normalizing the optical signal intensity of the output optical signal of the interferometer based on the reference optical signal intensity of the reference arm; and
determining a temperature based on the normalized optical signal intensity of the output optical signal and a characteristic curve that relates a range of output optical signal intensities to a range of temperatures.

14. The method for measuring temperature according to claim 13, further comprising:
splitting the input optical signal into a first beam and a second beam;
causing a temperature-dependent phase shift in the second beam relative to the first beam to produce a phase-shifted second beam; and
combining at least a portion of the first beam and the phase-shifted second beam to produce the output optical signal.

15. The method for measuring temperature according to claim 13, wherein the interferometer is a first interferometer, the optical signal intensity is a first optical signal intensity, the characteristic curve is a first characteristic curve, and the temperature is a first temperature range, the method further comprising:
measuring a second optical signal intensity of a second output optical signal of a second interferometer that receives the input optical signal; and
determining a second temperature range based on a second characteristic curve that relates a second range of output optical signal intensities to a second range of temperatures.

16. The method for measuring temperature according to claim 15, further comprising:
configuring the first interferometer and the second interferometer to cause the second temperature range to have a finer-level precision than the first temperature range; and
determining a higher resolution temperature based on the first temperature range and the second temperature range, wherein the second temperature range indicates a relative position in the first temperature range.

17. The method for measuring temperature according to claim 13, wherein the interferometer is a first interferometer, and the temperature is a first temperature range, the method further comprising:
  obtaining a second temperature range within the first temperature range based on wavelength information of a peak or a dip of a second interferometer; and
  determining a higher resolution temperature based on the first temperature range and the second temperature range.

18. The method for measuring temperature according to claim 13, further comprising:
  transmitting a calibration optical signal through the interferometer at a plurality of known temperatures;
  recording optical signal intensities of corresponding output optical signals of the interferometer; and
  generating the characteristic curve based on the plurality of known temperatures and the corresponding output optical signals.

19. The method for measuring temperature according to claim 13, wherein the characteristic curve is represented by a look-up table or a mathematical function, and determining the temperature comprises using the optical signal intensity as an index to the look-up table or as a parameter to the mathematical function.

20. The method for measuring temperature according to claim 13, further comprising:
  generating the input optical signal at the single wavelength having no tunability or a tunability range of 0.001 nanometers to 4 nanometers.

* * * * *